United States Patent [19]

Zopf

[11] 4,369,949

[45] Jan. 25, 1983

[54] LOUDSPEAKER PEDESTAL

[75] Inventor: David E. Zopf, Lansing, Mich.

[73] Assignee: CBS Industries, Lansing, Mich.

[21] Appl. No.: 153,189

[22] Filed: May 27, 1980

[51] Int. Cl.$^3$ .......................................... F16M 13/00
[52] U.S. Cl. ................................................ 248/632
[58] Field of Search ............... 248/632, 634, 346, 441, 248/174, 188.1; 297/461, DIG. 1; D6/186; 179/1 E, 146 E, 180; 181/151, 146, DIG. 1

[56] References Cited

U.S. PATENT DOCUMENTS

| | | | |
|---|---|---|---|
| 1,419,293 | 6/1922 | Myers | 248/632 |
| 3,193,236 | 7/1965 | Thorn | 248/632 |
| 3,460,786 | 8/1969 | Rivin | 248/634 |
| 3,720,285 | 3/1973 | Russell et al. | 181/151 |
| 3,788,581 | 1/1974 | Rutzick | 248/678 |
| 3,913,877 | 10/1975 | Wiener | 248/188.1 X |
| 4,073,460 | 2/1978 | Dale | 248/174 X |
| 4,078,757 | 3/1978 | Waters . | |

FOREIGN PATENT DOCUMENTS 897913  5/1962  United Kingdom ................ 248/346
960580  6/1964  United Kingdom ................ 248/634

*Primary Examiner*—William H. Schultz
*Assistant Examiner*—Ramon O. Ramirez
*Attorney, Agent, or Firm*—Price, Heneveld, Huizenga & Cooper

[57] ABSTRACT

A stronger, less expensive aesthetically pleasing speaker support is provided for elevating, inclining and vibration isolating a loudspeaker in relation to a floor surface. The speaker support or pedestal comprises a roughly box-shaped hollow rigid base structure for elevating a loudspeaker placed thereupon. The rigid hollow base structure is molded over and encased in a continuous layer of self-skinning, semi-rigid urethane foam for vibration isolating the loudspeaker. The support includes a floor engaging surface and a speaker engaging surface, the speaker engaging surface being inclined downwardly from front-to-back with respect to the floor engaging surface for inclining the loudspeaker. A speaker engaging stop is disposed along the back of the speaker engaging surface, the stop extending above the speaker engaging surface to prevent a loudspeaker from sliding therefrom.

5 Claims, 4 Drawing Figures

LOUDSPEAKER PEDESTAL

BACKGROUND OF THE INVENTION

The invention relates generally to loudspeaker supports and in particular, is directed to a stronger, less expensive and more aesthetically pleasing loudspeaker pedestal for elevating, inclining and vibration isolating a loudspeaker.

In present loudspeaker systems, due to the weight and size of the speakers, it is often necessary to rest the speakers on the floor of the room in which they are employed. However, while using the floor as a supporting surface for a loudspeaker is convenient, and provides the needed degree of physical support for the speaker, it has the disadvantage of creating a variety of acoustical disturbances in the room, such as acoustic coupling and acoustic resonances and reflections which tend to detract from speaker performance.

It has been known to construct speaker stands or pedestals from metal, plastic, or wood to help alleviate these problems. It has been known that elevating and inclining the speaker reduces the amount of acoustical energy reflected from the floor of the room and vibration isolating the speaker reduces acoustic feedback from the floor. As such, these prior art stands or pedestals tend to be relatively expensive, aesthetically displeasing, heavy or cumbersome and to have poor vibration isolating characteristics.

SUMMARY OF THE INVENTION

These and other problems in the prior art are solved by providing a speaker support or pedestal for elevating, inclining and vibration isolating the loudspeaker in relation to a floor surface comprising a roughly box-shaped, rigid and hollow base structure for elevating the loudspeaker. A continuous layer of self-skinning, semi-rigid urethane foam is molded over and encases the box-shaped rigid base structure for effectively vibration isolating a loudspeaker. The support is provided with a floor engaging surface and a speaker engaging surface. The speaker engaging surface is disposed above the floor engaging surface and is inclined downwardly from front-to-back relative to the floor engaging surface for inclining the loudspeaker. A speaker engaging stop is disposed at the back of the speaker engaging surface; the stop extending above and along the back of the speaker engaging surface for preventing a loudspeaker from sliding therefrom. The molded box-shaped pedestal provides an aesthetically pleasing structure that effectively elevates, inclines and vibration isolates the loudspeaker with minimum cost and complexity. The self-skinning urethane foam can be formulated and packed to have superior vibration dampening characteristics, it provides an aesthetically pleasing surface that does not easily soil and it adds strength and stability to the overall structure.

DESCRIPTION OF THE PREFERRED EMBODIMENTS

Figure 1:
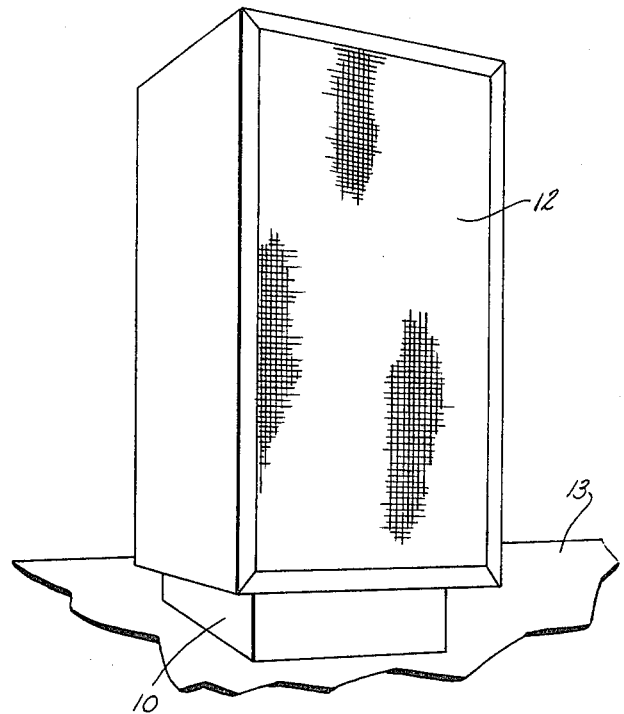
FIG. 1 is a perspective view of a loudspeaker mounted on the speaker support of the present invention.
Figure 2:
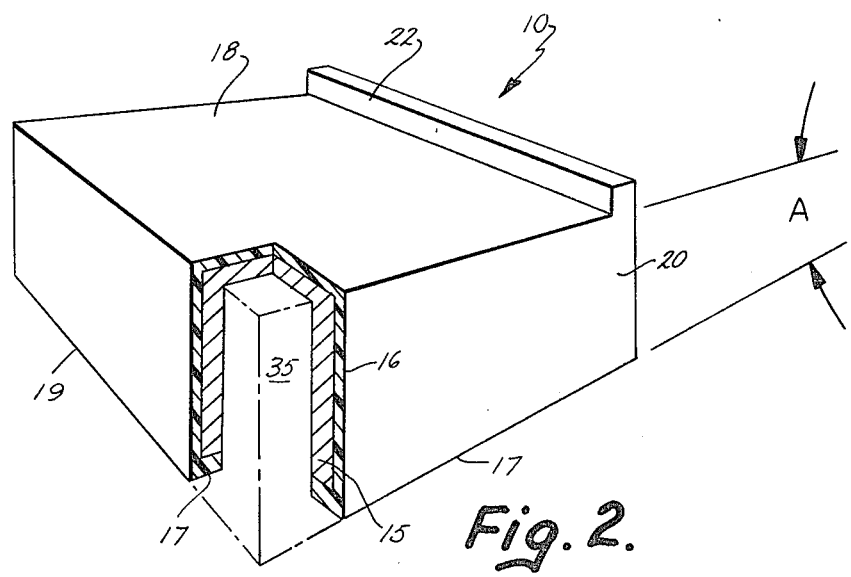
FIG. 2 is a perspective view, partially in section, of the speaker support of the present invention.

Referring to the Figures, and in particular to FIGS. 1 and 2, a speaker support 10 is provided for elevating, inclining and vibration isolating a loudspeaker 12 with respect to a floor surface 13. The speaker support comprises a roughly box-shaped, rigid, hollow base structure 15 for elevating the loudspeaker 12 above the floor surface 13. The rigid box-shaped base structure 15 provides a strong core for a simple and sturdy speaker supporting platform. This rigid base is encased in a continuous layer of self-skinning, semi-rigid urethane foam 16 for effectively vibration isolating the loudspeaker 12. This type of foam provides a smooth, fairly rigid molded surface but is flexible enough to dampen vibration received from the floor or the speaker. The foam can be formulated and packed to create superior vibration isolating characteristics. A floor engaging surface is disposed at 17 and a speaker engaging surface is disposed at 18. The speaker engaging surface 18 is inclined downwardly from the front of the support 19 to the back of the support 20 with respect to the floor engaging surface 17 for inclining the loudspeaker 12 placed thereupon. The angle of inclination A is generally in a range of 5° to 7°. A speaker engaging stop 22 extends along and above the back of the speaker engaging surface 18 to prevent the loudspeaker 12 placed thereupon from sliding therefrom.

Figure 4:
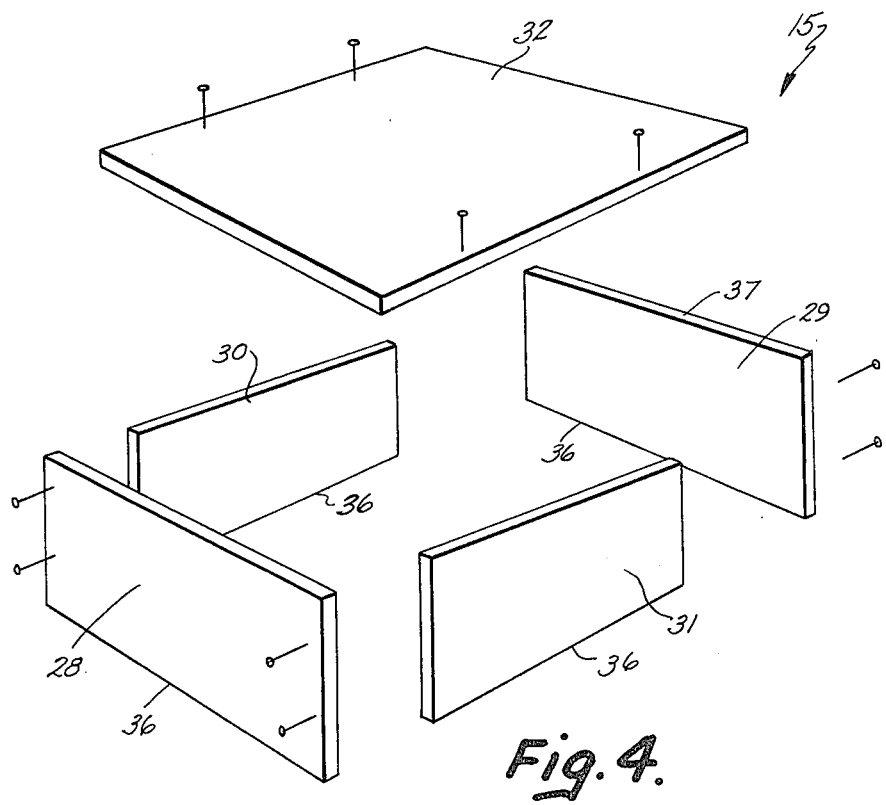
FIG. 4 is an exploded assembly of the base structure of the speaker support of the present invention.

With particular reference now to FIG. 4, the base structure 15 is illustrated in further detail. Preferably, the base structure 15 comprises a five piece particle board assembly that is initially nailed together at its abutting edges. Later, when the base structure is encased in foam, the foam will also act to structurally bind together the pieces of the assembly. The five piece assembly comprises a front 28, a back 29, a first side 30, a second side 31 and a top 32. These five pieces are assembled in an abutting relationship to define a roughly rectangular cavity 35, best illustrated in FIG. 2, having an open bottom. The bottom edges 36 of the front, back, first side and second side portions of the assembly define the floor engaging surface 17. The top portion 32 defines the speaker engaging surface 18. The upper edge 37 of the back 29 extends along and above the top 32 to define the stop 22. The members of the five piece assembly may also be formed from other materials such as wood or plywood, and other fastening means such as glue, tape or the like may be used to fasten the assembly together.

Figure 3:
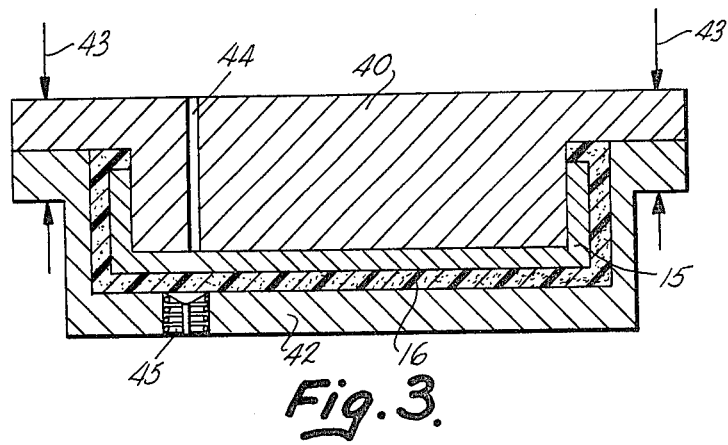
FIG. 3 is a sectional view of the molding apparatus employed to manufacture the speaker support of the present invention.

With particular reference now to FIG. 3, it is illustrated that the base structure 15 is encased in the foam 16 by inserting a male mold member 40 into the open bottom of the cavity 35 of the base structure 15. The male member 40 is sized so as to fit snugly within the cavity 35. Thereafter, a predetermined amount of foam is dispersed into a female mold member 42 and the male and female mold members 40 and 42 are clamped theretogether as indicated by the arrows 43. The foaming action of the self-skinning urethane foam therafter causes the foam 16 to expand around and encase the rigid base structure 15. The mold is unclamped and compressed air injected through air passage at 44, and a pop-up valve at 45 aid in ejecting the molded article from the male and female mold members. Before the molding process is initiated, preferably the male and female mold members are coated with a suitable release agent. Although other vibration isolating materials may be used to encase the rigid base structure 15, such as other plastics or felts, an open cell self-skinning urethane foam is preferred because it can be formulated and packed to have specific vibration dampening qualities; it is more aesthetically pleasing; it does not soil as easily; it is stronger and it lends more strength and stability to the overall structure. In the preferred embodiment, a urethane foam having a free rise density of 5 lbs per cubic foot is used and the foam is moderately packed in the mold cavity to achieve the best vibration dampening characteristics. After the molding process is completed, the support may be washed to remove any traces of the release agent, and may be painted with a water base lacquer.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows:

1. A speaker support for elevating, inclining and vibration isolating a loudspeaker in relation to a floor surface comprising:
   a roughly box-shaped, rigid hollow base structure for elevating a loudspeaker placed thereupon, said base structure having a top surface and downwardly extending sides terminating in bottom edges;
   a continuous layer of self-skinning, semi-rigid urethane foam molded over and encasing said box-shaped rigid base structure for vibration isolating a loudspeaker;
   a floor-engaging surface disposed on said support;
   a speaker-engaging surface disposed on said support above said floor-engaging surface, said speaker-engaging surface being inclined downwardly from front-to-back with respect to said floor-engaging surface for inclining a loudspeaker;
   a speaker-engaging stop disposed at the back of said speaker-engaging surface, said stop extending above said speaker-engaging surface to prevent a loudspeaker from sliding therefrom; and
   said foam layer extending continuously over the entire top surface of said base structure, downwardly over the exterior of the sides of said base structure, inwardly over the bottom edges of said base structure and over said stop, said floor-engaging surface being formed by said foam layer overlying the bottom edges of said base structure, said speaker-engaging surface being substantially imperforate and formed by said foam layer overlying the entire top surface of said base structure and atop said base structure, whereby vibration from a speaker disposed on said support, or from a surface upon which the support is positioned is effectively dampened by a foam layer engaging both the speaker and the floor surface upon which it rests while extending continuously therebetween.

2. The speaker support of claim 1 wherein said box-shaped rigid base structure comprises a five piece assembly, said foam layer encasing and structurally binding together said assembly.

3. The speaker support of claim 2 wherein said five piece assembly comprises a front, a back, a first side, a second side and a top defining a roughly rectangular cavity with an open bottom, the bottom edges of said front, back, first side and second side underlying and defining said floor-engaging surface, said top underlying and defining said speaker-engaging surface, said back extending above the level of said speaker-engaging surface for underlying and defining said speaker-engaging stop.

4. The speaker support of claim 3 wherein said five piece assembly comprises five abutting pieces of particle board nailed together.

5. The speaker support of claim 4 wherein said speaker supporting surface is inclined 5° to 7° with respect to said floor-engaging surface.

* * * * *